US005207805A

United States Patent [19]

Kalen et al.

[11] Patent Number: 5,207,805

[45] Date of Patent: May 4, 1993

[54] CYCLONE SEPARATOR SYSTEM

[75] Inventors: Bodo Kalen, Huntington Bay; Nicholas L. Giuricich, Dix Hills, both of N.Y.

[73] Assignee: Emtrol Corporation, Hauppauge, N.Y.

[21] Appl. No.: 860,296

[22] Filed: Mar. 27, 1992

Related U.S. Application Data

[63] Continuation of Ser. No. 757,457, Sep. 10, 1991, abandoned, which is a continuation-in-part of Ser. No. 640,022, Jan. 11, 1991, Pat. No. 5,122,171.

[51] Int. Cl.[5] .......... B01D 45/12

[52] U.S. Cl. .......... 55/1; 55/459.1; 55/459.5; 210/512.1

[58] Field of Search .......... 55/459.1, 459.5, 1, 55/52; 210/512.1

[56] References Cited

U.S. PATENT DOCUMENTS

| | | | |
|---|---|---|---|
| 2,816,490 | 12/1957 | Boadway et al. | 210/512.1 |
| 3,172,844 | 3/1965 | Kurz | 210/512.1 X |
| 3,243,941 | 4/1966 | Peterson | 210/512.1 X |
| 3,970,437 | 7/1976 | Van Diepenbroek et al. | 55/459.1 X |
| 4,824,449 | 4/1989 | Majoros | 55/459.1 |

*Primary Examiner*—Charles Hart
*Attorney, Agent, or Firm*—Robbins & Robbins

[57] ABSTRACT

An improved cyclone separator and method of construction are disclosed. Such cyclone separators are employed for separating particulates from hot gas entering the separator barrel through an axially disposed slot in its periphery. An improvement in efficiency and recovery of very small particulates is achieved by making the slot very narrow so that the particulates enter the barrel very near its inner surface, thus having less distance to travel under centrifugal force in order to reach said inner surface. In accomplishing this objective, however, it has been discovered that, for the particular inlet gas velocity selected, the structure under certain design conditions will act as a cavity resonator with the characteristic frequencies of the cavity matching the frequency of the incoming gas as it rotates in the barrel, thus causing the structure to function as a resonator thereby destroying the efficiency or, in extreme cases, having catastrophic results (in the mathematical sense). The application explains how this hazard can be avoided. The separator unit is provided with a novel converging inlet to enhance separation efficiency, and a method is provided for increasing bypass of particulate past the separator units without adversely affecting the operation thereof.

24 Claims, 6 Drawing Sheets

CYCLONE SEPARATOR SYSTEM

RELATED APPLICATION

The present application is a continuation of Ser. No. 757,457 filed Sept. 10, 1991 and now abandoned which is a continuation-in-part of Ser. No. 640,022 filed Jan. 11, 1991 now U.S. Pat. No. 5,122,171.

BACKGROUND OF THE INVENTION

This invention relates to an apparatus for separating particulate material from hot gas, the apparatus being commonly known as a cyclone separator. The invention also pertains to a method of constructing such apparatus. With increasing demand to eliminate air pollution accompanied by stringent antipollution laws, and with the need for maximum conservation of energy, there has been a continuing effort to seek out means of improving such cyclone separators.

Perhaps the simplest form of cyclone separator comprises a cylindrical barrel having an inlet orifice extending axially along one end of its periphery and a short gas outlet or discharge tube extending axially along the length of said inlet orifice and outwardly beyond a flat disc member closing the end of the separator between the barrel and said outlet tube. The opposite end of the barrel is open for discharge of the separated particulates.

Cyclone separators of this simple type have been researched and analyzed over the years almost to what one could characterize as the point of exhaustion. Such research invariably has had two primary goals: to increase the efficiency and to provide ways of separating smaller and smaller particulates. In particular, in the removal of residual catalyst in the effluent flue gases from the fluid catalyst cracking process as used in the petroleum industry there has been a continuing struggle to retrieve more and more catalytic particulates as far down as the 5 micron diameter range.

In the light of this background it is extremely surprising that unsuspected problems have now been solved resulting, as demonstrated by actual tests, in 100% recovery of 5.5 micron particulates and as much as 50% of 3 micron particulates. In fact, it is now feasible to make significant recovery of particulates with diameters as low as 1.5 microns.

SUMMARY OF THE INVENTION

Most any expert in this field has long been aware of the critical nature of interdependent dimensions such as barrel diameter and length, in outlet tube dimensions and length, inlet orifice dimensions and the positioning of the orifice with respect to the disc. In these circumstances, it would not be surprising to find that others may have recognized the theoretical advantage of employing as inlet orifice a long narrow slot, say with a 10" dimension in the axial direction and a 1" radial width in the case of a barrel of 12" diameter. Also, it might be expected to discover that others have considered the idea of accelerating the particulate laden gas as it approaches such inlet. The reasoning which would undoubtedly have prompted such thought is that time travel of the individual particulates outwardly to the inner surface of the barrel under centrifugal force is one of the prime considerations determining size and efficiency of particulate recovery. Clearly, the closer to said inner surface of the barrel the particulates can be placed at the time of entry, the less travel time will be required to reach said inner surface. It should be noted that, in the industry, particulate recover (or what is commonly referred to as "settling out") is considered to be achieved when the individual particulate reaches said inner surface of the barrel.

It is believed the present invention has succeeded where others would have failed because of the solution of an extremely important and hazardous underlying problem. It has been discovered that a cyclone separator of this specific type has what may be called "characteristic frequencies". Successive revolutions of the spiraling vortex as the gas advances axially will establish a gas wave frequency. The cavity of the separator will also have a natural fundamental frequency of vibrations together with inconsequential harmonic frequencies, these being the "characteristic frequencies" of the system. When the gas frequency and this fundamental frequency coincide, it has been found that catastrophic resonant vibration (in the mathematical sense) can result. This vibration can be of such magnitude that in short order, it would probably destroy the entire apparatus. This problem is of special importance in installations where the individual cyclone separator may be one of say forty or fifty units assembled as a combination in an over-all system.

The present invention resides in identification of the conditions of resonance and properly avoiding the effects thereof, this being accomplished with use of the narrow slit and substantial gas velocity.

According to the present invention there is provided a cyclone separator of a type adapted to separate particulates from a hot particulate laden gas entering a cylindrical cyclone barrel at a predetermined velocity through a slot disposed at one end of the periphery of the barrel and extending in the axial direction thereof. The barrel end is closed by a disc member which supports in concentric relation to the barrel a gas discharge tube of substantially smaller diameter than the barrel with one end portion of said tube extending inwardly in the barrel a distance substantially commensurate with the axial length of the slot and the other end portion extending axially outwardly from the barrel. The axial length of the slot is very substantially less than the axial length of the barrel and the axial length of the barrel differs from what would be the theoretical characteristic frequency length commensurate with the corresponding frequency of the gas in said barrel at the predetermined velocity by an amount sufficient to suppress the natural tendency for the separator to act as a resonator.

The invention also provides a method of constructing a cyclone separator of a type adapted to separate particulates from a hot particulate laden gas entering a cylindrical cyclone barrel at a predetermined velocity through a slot disposed at one end of the periphery of the barrel and extending in the axial direction thereof. The slotted end of such barrel is closed with a disc member which supports in concentric relation to the barrel a gas discharge tube of substantially smaller diameter than the barrel with one end portion of said tube extending inwardly in the barrel a distance substantially commensurate with the axial length of the slot and the other end portion extending axially outwardly of the barrel. The axial lengths of the slot and the barrel are proportioned so that the axial length of the slot is very substantially less than the axial length of the barrel and the length of the barrel differs from what would be the theoretical characteristic frequency length commensurate with the corresponding frequency of the gas in said barrel at the predetermined velocity by an amount sufficient to suppress the natural tendency for the separator to act as a resonator.

While the present invention has a wide range of uses in cyclone separators, it is of very special value in meeting two specific requirements: where the separator is to serve as a third or "tertiary" separator in the final stage of removal of fine dust before a gas is discharged into the atmosphere and where a hot gas is to be fed to downstream power recovery equipment under circumstances in which even the presence of very fine dust has a deleterious effect.

The invention also introduces a separator unit with a special convergent inlet which minimizes the inlet velocity at the entrance to the cyclone separator. This lower velocity at the entrance to the separator results in lower drag forces on the particulates causing greater amounts of particulate by-pass and disposition for separation.

This concept leads directly to a novel method of enhancing the efficiency of the cyclone separator by increasing the amount of particulate material which, having by-passed the cyclone separator may be separately recovered without impairing the efficiency of the separator.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
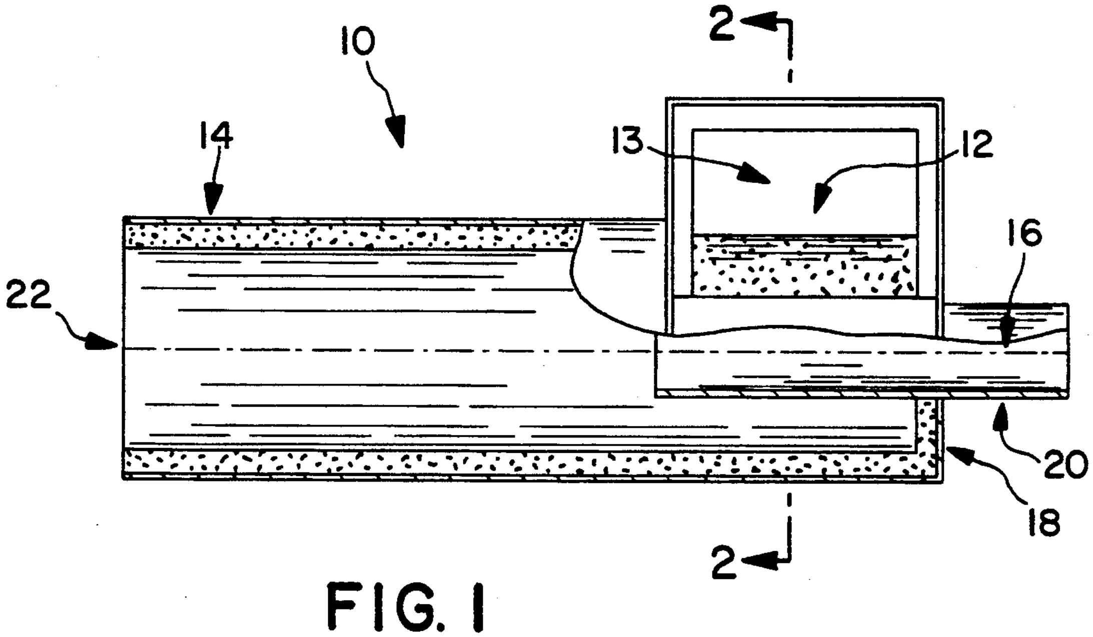
FIG. 1 is a view partly in axial section of a side elevation of a typical separator unit.

The particulate laden gas separator, or cyclone separator is generally referred to by the reference numeral 10 in FIG. 1. The particulate laden gas at substantial velocity, say 120 ft. per second, is forced into the cyclone unit through slot 12, see FIG. 2, of the funnel shaped structure 13. The slot 12 preferably has a so called "aspect ratio". i.e. ratio of longitudinal width to radial height in the order of 10 to 1, for example 10 inches in axial length and 1 inch radial outward clearance.

The cyclone separator comprises a barrel 14 and a clean gas discharge tube 16 mounted on said barrel 14 by an end flange or ring 18, as by welding. An exterior end 20 of discharge tube 16 serves for withdrawing clean gas from the cyclone separator.

The inner end of discharge tube 16 normally extends slightly beyond the slot 12, say to a distance of 11 inches if the slot extends 10", and serves to collect the clean gas. The opposite end 22 of barrel 14 is open and serves as a discharge port for the collected particulates.

In operation, as the particulate laden gas at a high velocity is fed into the barrel 14 through slot 12, centrifugal force will initially produce a tendency for both the gas and the particulates to move outwardly against the inner surface of the barrel and form a screw like vortex, with a tendency to move toward discharge end 22 of barrel 14.

As time elapses, first the heavier particulates and then the lighter particulates will find their way to the inner surface of barrel 14 where they will continue to move toward particulate discharge end 22.

As the particulates are removed from the gas, the centrifugal force will gradually be dissipated and the gas molecules will then respond to pressure forces to move radially inward, reverse direction of flow and exit through discharge tube 16. It is customary to permit a small increment of the incoming gas, say up to about 4% to exit through particulate discharge end 22 to assist in efficient removal of the particulates.

Figure 2:
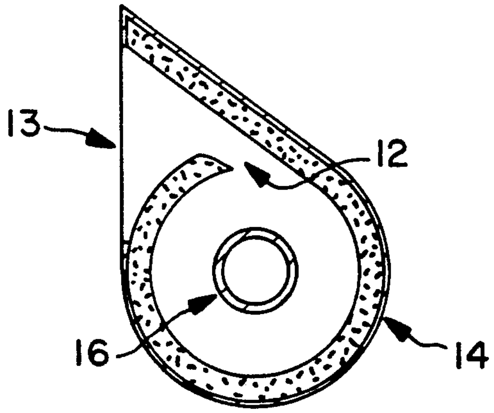
FIG. 2 is a view along section 2—2 if FIG. 1.

A certain portion of the approaching larger particulates in the hot particulate laden gas passing in the direction of the arrow in FIG. 2 will by-pass the separator and descend for separate recovery. It is desirable to maximize the amount of particulates which bypass the separator, since additional bypass will enhance separation efficiency and reduce wear on the separator units. Such bypass is provided through the use of the novel cyclone inlet design shown in FIGS. 1 and 2. These embodiments utilize an inlet configuration with the flared inlet structure which converges to the smaller slot 12 creating an accelerating flow once the gas enters the convergent inlet.

A convergent cyclone inlet design normally uses an inlet opening which is an extension of the cyclone throat inlet area; thus, the velocity at the cyclone inlet with the converging opening of the present invention will be significantly lower than in the conventional cyclone design. The reduced entrance velocity at the convergent inlet results in lower drag forces on the particulate which otherwise tend to carry the particulate into the cyclone inlet; thereby resulting in greater amounts of larger particulate bypass.

Particular attention has been focused on the use of small diameter cyclones, i.e., those having a diameter of the order of 12 inches. Hundreds of tests have been conducted, utilizing conventional full size collecting elements and extremely fine fluid catalyst powder, typically with an average diameter of approximately 12 microns. For each test inlet, separated, and escaping catalyst samples were collected. Careful particulate size distribution was conducted on theses samples. Separation efficiency was logged by determining inlet dust weight and cyclone catch. Pressure drops characteristics were simultaneously measured. Tests were conducted with structures of differing dimensions, different inlet configurations, various thruputs and blowdown rates in the external test equipment, and a range of velocities, from under 100 ft/sec to over 150 ft/sec.

With this accumulation of data, and well established cyclone theory, mathematical correlations were formulated to permit calculation of separation efficiencies for each particulate size. Similarly, pressure drop data for each structure configuration was characterized, and correlations were formulated.

Figure 3:
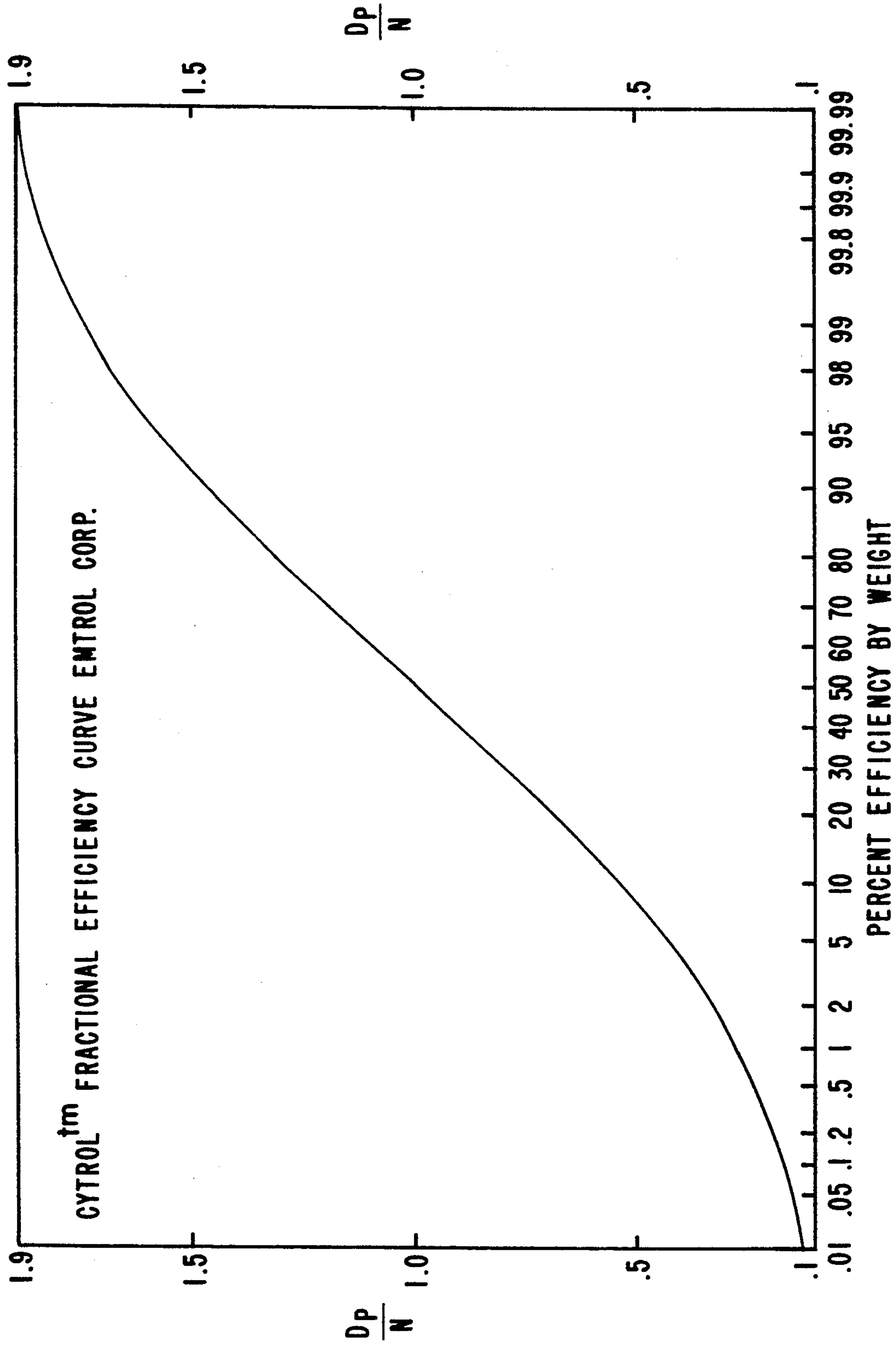
FIG. 3 is a Fractional Efficiency Curve.

The curve of FIG. 3 depicts efficiency for ratio of Dp/N, where Dp represents any selected particulate diameter and N is the so-called "calculated efficiency characteristic number". N depends on the specific design of the novel cyclone separator and the operating variables at which it is functioning. Typically, efficiency characteristics of N=3 are achievable at acceptable pressure drop resulting in 100% recovery of particulates of 6 microns diameter and recovery rate as much as 50% of 3 micron particulates. This will be explained in more detail with reference to specific tests.

Figure 4:
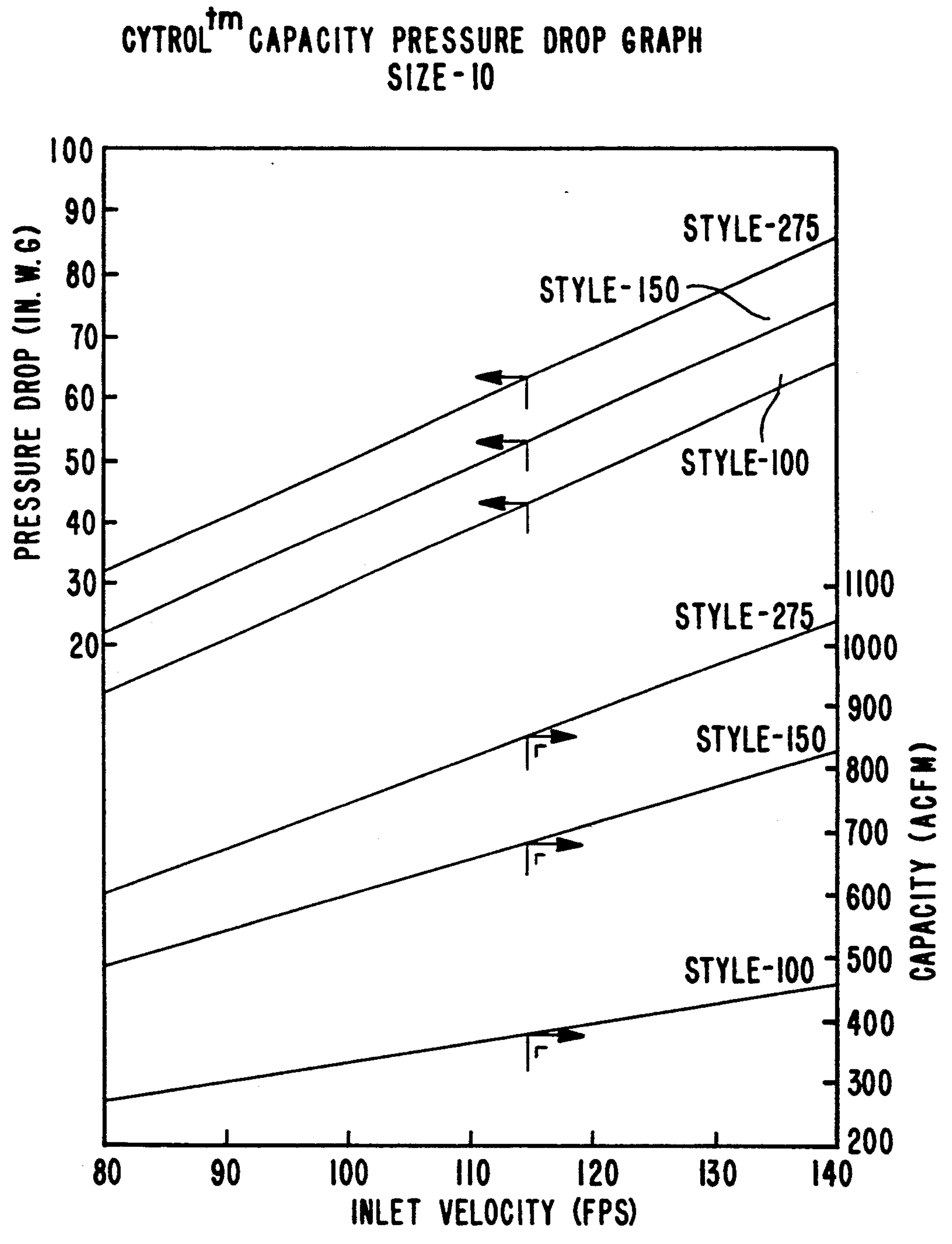
FIG. 4 is a Capacity/Pressure Drop curve.

FIG. 4 depicts the Capacity and Pressure Drop characteristic of three different "styles" of novel cyclone separators. (The word "style" is used in an arbitrary way to identify individual structures which were tested). Units with lower capacity have been found to be more efficient. This has the practical value of allowing flexibility in obtaining optimum selection to meet specific installation requirements.

Figure 5:
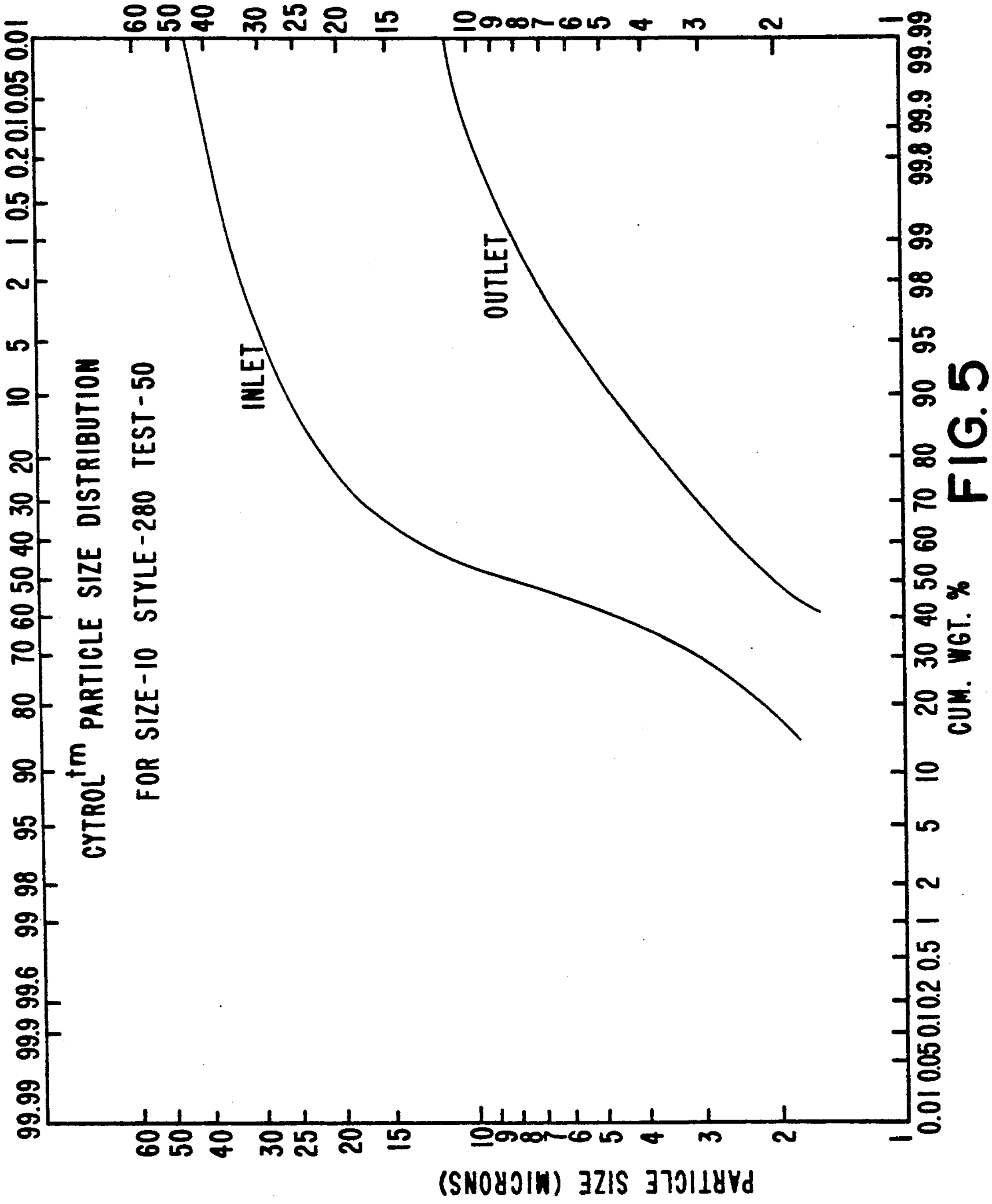
FIG. 5 is a particulate size distribution curve for test No. 50.

FIG. 5 shows particulate size distribution as evaluated in a structure identified as "style 280". TABLE I below sets out the details of test No. 50 as performed on this structure.

TABLE I

| Feature | Style 280 | Style 150 | Style 100 |
|---|---|---|---|
| Test number | 50 | 99 | 185 |
| Characteristic "N" number | 4.1 | 2.6 | 2.1 |
| Collection efficiency % | 61.1 | 76.0 | 82.7 |
| Inlet to outlet Δp inches water gauge | 50 | 67 | 57 |
| Withdraw flow % | 2 | 2 | 4 |
| Inlet width (inches) | 2.75 | 1.5 | 1 |
| Inlet length (inches) | 6.5 | 9.5 | 8 |
| Outlet particulate size distribtution (microns) | | | |
| >10% | 1.05 | 1.01 | 1.03 |
| >50% | 1.93 | 1.52 | 1.71 |
| >90% | 4.74 | 3.78 | 3.68 |
| >100% | 11.0 | 5.50 | 5.50 |
| Inlet particulate size distribution (microns) | | | |
| >10% | 1.38 | 1.27 | 1.28 |
| >50% | 7.94 | 9.41 | 13.66 |
| >90% | 26.22 | 27.63 | 29.23 |
| >100% | 44.00 | 44.00 | 44.00 |

Figure 6:
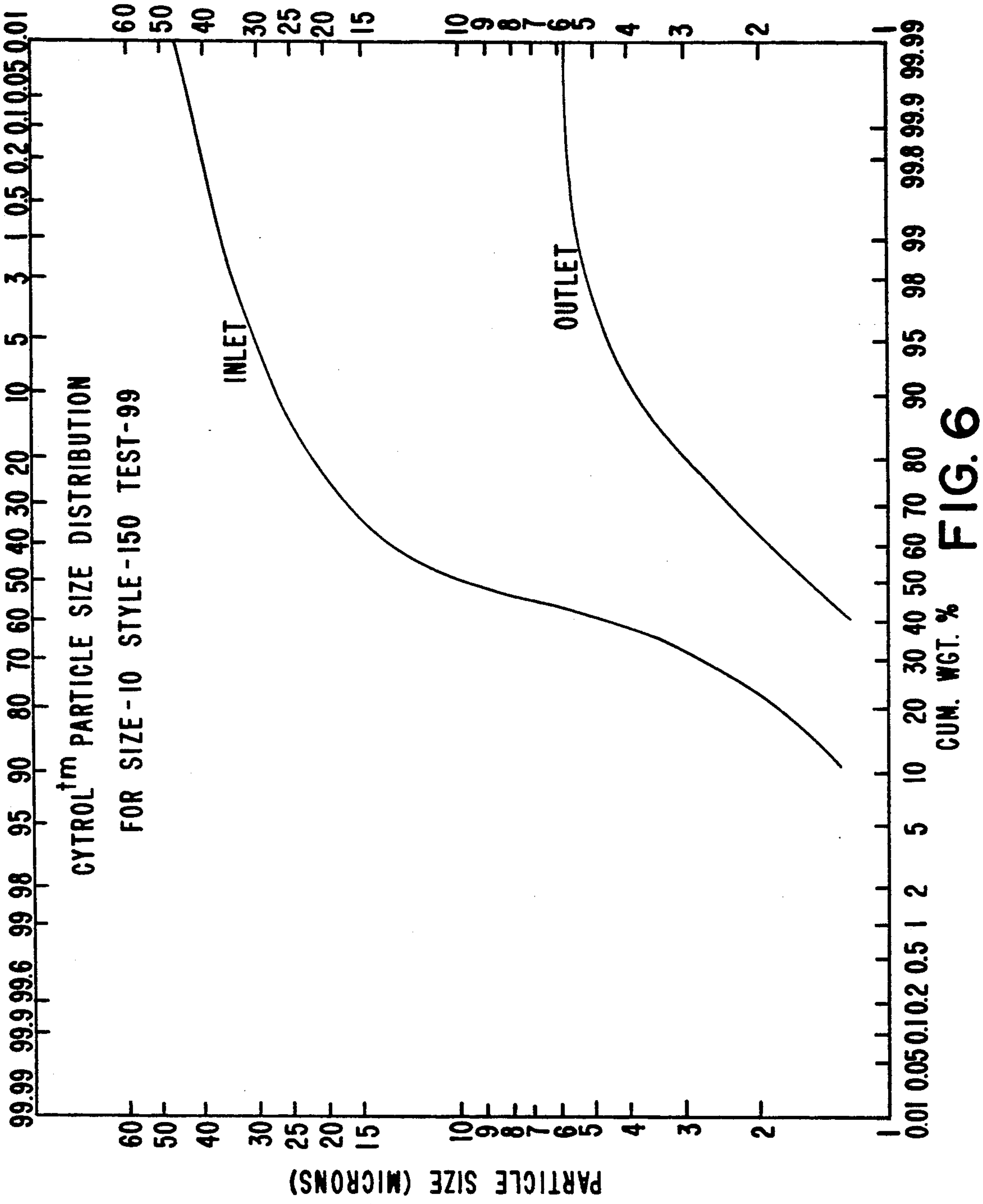
FIG. 6 is a particulate size distribution curve for test No. 99.
Figure 7:
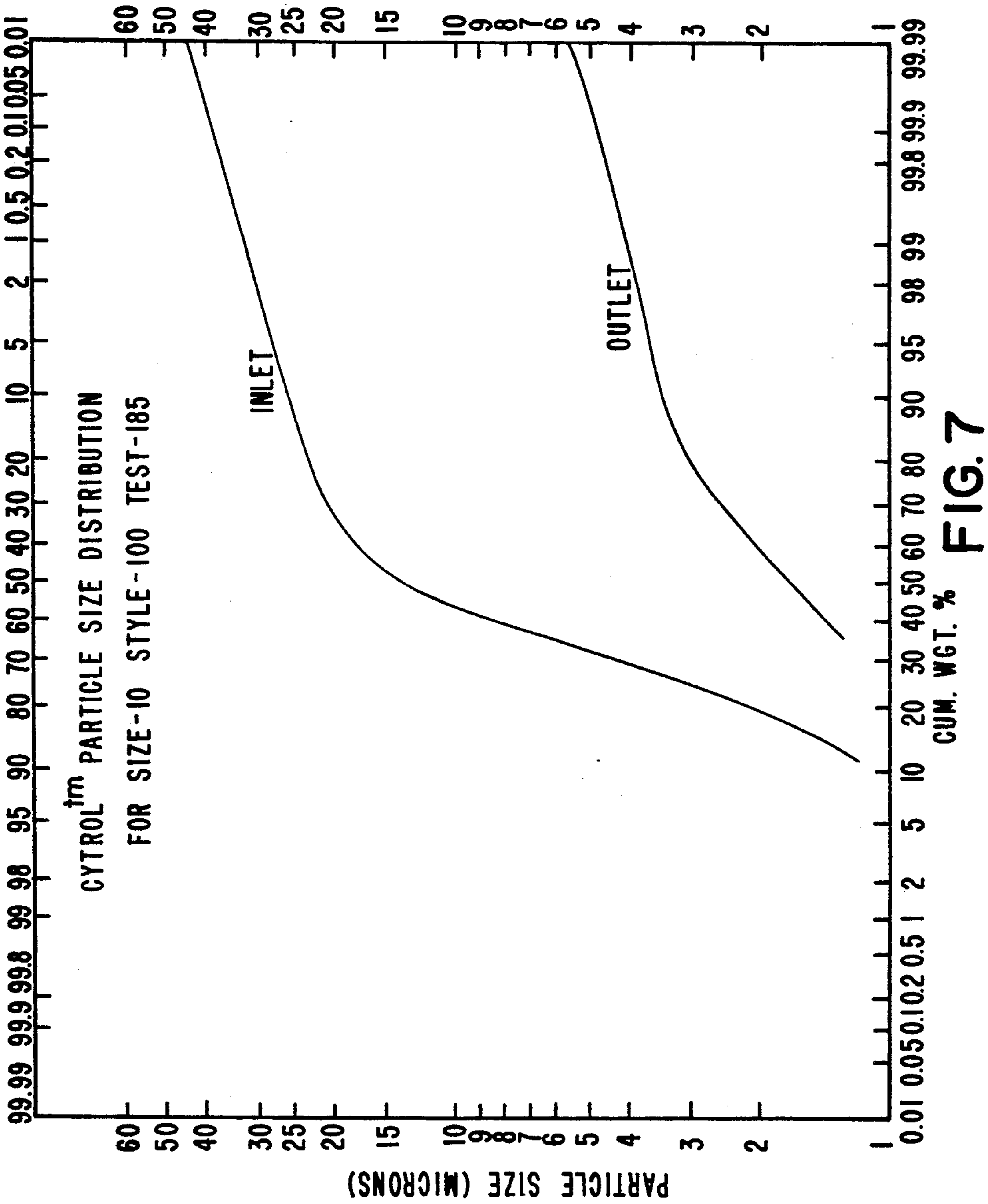
FIG. 7 is a particulate size distribution curve for test No. 185.

FIGS. 6 and 7 show "style 150" (test No. 99) and "style 100" (test No. 185). As forecast earlier, both of these tests indicate virtually 100% recovery of 5.5 micron particulates. Their details are also set in TABLE I. These three examples, which are the best available as a result of actual tabulation, provide a fair display of the relationship of inlet aspect ratio to efficiency. For the ratio 6.5/2.75=2.36 to 1 for style 280 the efficiency is 61.1%. For the ratio 9.5/1.5=6.33 to 1 for style 150 the efficiency is 76.0% and for the ratio 8 to 1 of style 100 the efficiency is 82.7%. While it has been considered unnecessary to carry out exhaustive further tests to determine the exact aspect ratio yielding maximum efficiency, the many tests which have been performed indicate it is in the neighborhood of 10 to 1.

While it was most gratifying to achieve these exceptional results, they were coupled with a most alarming problem. At times, under what initially appeared to be random circumstances, heavy vibration would ensue, sometimes simply of a magnitude which destroyed the efficiency but at other times so violent that it could have ruined the equipment. This problem took on added importance when one considers that these small cyclone separators are often used in batteries of from fifty to one hundred units.

After careful study it was surmised that the new structure must be vulnerable to the phenomenon known in electronics and sound theory as resonance, wherein under certain conditions the new cyclone separator must be acting as a resonator.

Further study revealed that this is apparently a rather rare phenomenon in fluid mechanics, quite distinct from such disturbances as shock waves, traveling waves and water hammer. Resonance is known to occur in compressors and turbines, but the association is with moving parts.

During further study it was found that at page 268 of the treatise FLUID MECHANICS (2nd Edition) by L. D. Landau and E. M. Lipshitz published by Pergamon Press, a brief but highly informative explanation has been given of what in fluid mechanics constitutes a "resonator". The analysis hinges on the following standard equations for wave velocity and wave pressure:

Wave velocity: $v=\delta\phi/\delta x=-(a\omega/c)\cos\omega t\sin\omega x/c$

Wave pressure: $p'=-\rho\delta\phi/\delta t=\rho\omega\sin\omega t\cos\omega w/c$ where $\phi$ is the standard symbol representing a wave function, $\rho$ in the field of fluid mechanics is the density of the particulate laden gas, $\omega$ is its angular velocity, x is axial length and $a\omega/c$ is wave amplitude where a is a function of the barrel diameter, and c is the velocity of sound.

These equations, as applied in the study of acoustics to so-called "Cavity Resonators" are discussed in detail at pages 258 to 261 of the treatise VIBRATIONS AND SOUND by Philip M. Morse published by McGraw-Hill (1948). The author draws the two following conclusions:

> "Resonance occurs whenever the frequency equals of one of the natural frequencies of vibration of the closed pipe . . ."
>
> "If the wave length happens to be the proper size, resonance occurs".

Armed with this knowledge, further tests were performed. It was ultimately found that the principles underlying the above equations did in fact apply. This came to light, however, only after substantial exploration. It was immediately recognized that the constant c in these equations represents the velocity of sound in air. (Compressed air was being used for testing). It was recognized that the velocity of sound in air is about 1,128 ft/sec at 68° F., but the question arose as to whether adding the powder to the air might change this velocity. From vibrating string theory where the velocity $n=\sqrt{T/\rho}$ it was recognized that $c=\sqrt{T/\rho}$ where T would be the linear tension in the particulate laden gas and $\rho$ would be the unit density. Tests ultimately led to the conclusion that density was not an important factor.

It was also recognized that the frequency $\omega$ in the above equations would be expressible in terms of peripheral velocity of the gas in the cyclone separator so that increased gas velocity would be translatable to increased frequency. Tests are believed to have proved this out since at about 93 ft/per second low frequency vibration was detected, at 120 ft/per second no vibration was detected and at about 148 ft/sec a higher frequency vibration began to appear. It was also noted from the above equations that the longitudinal relationship between barrel 14 and slot 12 had an important bearing on the vibration. Through experiment it was found that adding a small increment of the order of about 6" of barrel extension removed the vibration by destroying the resonance.

The principles developed by these tests enable one to design with confidence a cyclone separator of the new type to meet specific industrial requirements.

Various changes and modifications may be made within this invention as will be apparent to those skilled in the art. Such changes and modifications are within the scope and teaching of this invention as defined in the claims appended hereto.

What is claimed is:

1. A cyclone separator of a type adapted to separate particulates from a hot particulate laden gas entering a cylindrical cyclone barrel at a predetermined velocity through a slot disposed at one end of the periphery of said barrel and extending in the axial direction thereof, wherein said barrel end is closed by a disc member which supports in concentric relation to the barrel a gas discharge tube of substantially smaller diameter than the barrel a distance substantially commensurate with the axial length of the slot and the other end portion extending axially outwardly from the barrel, the axial length of the slot being very substantially less than the axial length of the barrel and said axial length of the barrel differing from what would be the theoretical characteristic frequency length commensurate with the corresponding frequency of the gas in said barrel at the predetermined velocity by an amount sufficient to suppress the natural tendency for the separator to act as a resonator.

2. A cyclone separator according to claim 1 wherein the aspect ratio of said slot is in the order or approximately 10 to 1.

3. A cyclone separator according to claim 1 wherein the outer diameter of the barrel is in the order of approximately 12 inches.

4. A cyclone separator according to claim 1 wherein a convergent duct is positioned to accelerate the particulate laden gas as it enters the slot.

5. The apparatus of claim I in which the cyclone separator has an inlet in the form of a convergent inlet structure, the inlet has an opening which is substantially parallel to flow of said hot particulate laden gas.

6. The apparatus of claim 5 in which the inlet opening of said converging inlet member is positioned in a vertical plane for downward vertical flow of said hot particulate laden gas.

7. The apparatus of claim 5 in which said cyclone separator comprises a cylindrical barrel, and said converging inlet structure is positioned on a portion of said barrel.

8. The apparatus of claim 7 in which the convergent inlet structure communicates tangentially with said separator barrel for delivering said particulate laden hot gas tangentially to an interior wall thereof.

9. The apparatus of claim 5 in which the convergent inlet structure comprises a converging box-like structure the interior of which is insulated on at least three sides.

10. A method of constructing a cyclone separator of a type adapted to separate particulates from a hot particulate laden gas entering a cylindrical cyclone barrel at a predetermined velocity through an inlet slot disposed at one end of the periphery of said barrel and extending in the axial direction thereof, which comprises closing the slotted end of such barrel with a disc member which supports in concentric relation to the barrel a gas discharge tube of substantially smaller diameter than the barrel with one end portion of said tube extending inwardly in the barrel a distance substantially commensurate with the axial length of the slot and the other end portion extending axially outwardly of the barrel, and proportioning the axial length of the slot and the barrel so that the axial length of the slot is very substantially less barrel differs from what would be the theoretical characteristic frequency length commensurate with the corresponding frequency of the gas in said barrel at the predetermined velocity by an amount sufficient to suppress the natural tendency for the separator to act as a resonator.

11. A method according to claim 10 wherein the characteristic frequency length of the cavity in the barrel is determined by use of the standard wave equations $$\text{Wave velocity}: v=\delta\phi/\delta x=-(a\omega/c)\cos\omega t\sin\omega x/c$$

$$\text{Wave pressure}: p'=-\rho\delta\phi/\delta t=\rho\omega\sin\omega t\cos\omega w/c$$

where, in the field of fluid mechanics, $\rho$ is the density of the particulate laden gas, $\omega$ is its angular velocity, x is axial length and $a\omega/c$ is wave amplitude where a is a function of the barrel diameter.

12. A method according to claim 10 in which the gas entering each separator at the inlet slot is given circular motion in a converging region leading to the slot and the interior of said separator unit.

13. The method of claim 10 in which the converging region has an opening in a plane substantially parallel to the flow of the particulate laden gas with provision for introducing the particulate laden gas to each separator in a direction transverse to said flow, and accelerating the particulate laden gas as it proceeds in said transverse direction, whereby an increase in the quantity of particulate material passing through said particulate outlet is achieved without impairing the efficiency of the separator unit.

14. A method according to claim 13 in which the interior of said separator unit is cylindrical, and the circular motion imparted to the particulate laden gas causes its motion to progress along the outer periphery of the interior of the cylinder.

15. A cyclone separator of a type adapted to separate particulates from hot particulate laden gas entering a cylindrical cyclone barrel at a predetermined velocity thorough a slot disposed at one end of the periphery of said barrel and extending in the axial direction thereof, wherein said barrel end is closed by a disc member which supports in concentric relation to the barrel a gas discharge tube of substantial smaller diameter than the barrel a distance substantially commensurate with the axial length of the slot and the other end portion extending axially outwardly from the barrel, the axial length of the slot being very substantially less then the axial length of the barrel and a converging inlet member connected to said slot for accelerating the particulate laden gas with the separator, said slot having an aspect ratio in the order of approximately 10 to 1.

16. A cyclone separator according to claim 15 wherein the outer diameter of the barrel is in the order of approximately 12 inches.

17. The apparatus of claim 15 in which the inlet member has an opening which is substantially parallel to flow of said hot particulate laden gas.

18. The apparatus of claim 17 in which the inlet opening of said converging inlet member is positioned in a vertical plane for downward vertical flow of said hot particulate laden gas.

19. The apparatus of claim 15 in which said cyclone separator comprises a cylindrical barrel, and said converging inlet structure is positioned on a portion of said barrel.

20. The apparatus of claim 19 in which the convergent inlet structure communicates tangentially with said separator barrel for delivering said particulate laden hot gas tangentially to an interior wall thereof.

21. The apparatus of claim 17 in which the convergent inlet structure comprises a converging box-like structure the interior of which is insulated on at least three sides.

22. A method of enhancing the efficiency of a cyclone separator of the type receiving a particulate laden hot gas for separating particulates in a particulate outlet from clean gas which comprises disposing a inlet opening for said cyclone separator in a plane substantially parallel to flow of the particulate laden gas with provision for introducing the particulate laden gas to said cyclone separator in a direction transverse to said particulate laden gas flow, and accelerating the particulate laden gas as it proceeds in said transverse direction, whereby an increase in the quantity of particulate material passing through particulate outlet is achieved without impairing the efficiency of the cyclone separator.

23. A method according to claim 22 in which the gas entering the cyclone separator at the inlet opening is given circular motion in a converging region leading to the interior of said cyclone separator.

24. A method according to claim 23 in which the interior of said separator unit is cylindrical, and the circular motion imparted to the particulate laden gas causes its motion to progress along the outer periphery of the interior of the cylinder.

* * * * *

UNITED STATES PATENT AND TRADEMARK OFFICE

CERTIFICATE OF CORRECTION

PATENT NO. : 5,207,805

DATED : May 4, 1993

INVENTOR(S) : Bodo Kalen and Nicholas L. Giuricich

It is certified that error appears in the above-indentified patent and that said Letters Patent is hereby corrected as shown below:

Claim 10, col. 8. line 11, after "less" add -- than the axial length of the barrel and the length of the --.

Claim 11, col. 8, line 24, change "$\omega w/c$" to -- $\omega x/c$ --.

Claim 15, col. 8, line 64, change "with" to -- within --.

Claim 22, col. 10, line 2, change "a" to -- an --.

Signed and Sealed this

Fourth Day of January, 1994

Attest:

BRUCE LEHMAN

*Attesting Officer*

*Commissioner of Patents and Trademarks*